US012695973B2

(12) United States Patent
Shimizu et al.

(10) Patent No.: US 12,695,973 B2
(45) Date of Patent: Jul. 28, 2026

(54) CAMERA CONTROL APPARATUS, CONTROL METHOD, AND NON-TRANSITORY COMPUTER READABLE MEDIUM

(71) Applicant: NEC Corporation, Tokyo (JP)

(72) Inventors: Yuta Shimizu, Tokyo (JP); Kazuki Inagaki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 71 days.

(21) Appl. No.: 18/724,221

(22) PCT Filed: Mar. 16, 2022

(86) PCT No.: PCT/JP2022/012070
§ 371 (c)(1),
(2) Date: Jun. 26, 2024

(87) PCT Pub. No.: WO2023/175803
PCT Pub. Date: Sep. 21, 2023

(65) Prior Publication Data
US 2025/0071408 A1      Feb. 27, 2025

(51) Int. Cl.
*H04N 23/611* (2023.01)
*G06V 10/98* (2022.01)
(Continued)

(52) U.S. Cl.
CPC ........... *H04N 23/611* (2023.01); *G06V 10/98* (2022.01); *G06V 20/597* (2022.01); *G06V 40/172* (2022.01); *H04N 23/71* (2023.01)

(58) Field of Classification Search
CPC ...... H04N 23/611; H04N 23/71; G06V 10/98; G06V 20/597; G06V 40/172
(Continued)

(56) References Cited

U.S. PATENT DOCUMENTS

| | | | | |
|---|---|---|---|---|
| 12,108,162 B2 * | 10/2024 | Dobashi | ............... | H04N 23/611 |
| 12,354,407 B2 * | 7/2025 | Ogino | .................. | G06V 10/145 |

(Continued)

FOREIGN PATENT DOCUMENTS

| | | |
|---|---|---|
| JP | 2004-328077 A | 11/2004 |
| JP | 2008-040781 A | 2/2008 |

(Continued)

OTHER PUBLICATIONS

International Search Report for PCT Application No. PCT/JP2022/012070, mailed on Jun. 7, 2022.
(Continued)

*Primary Examiner* — Asmamaw G Tarko
(74) *Attorney, Agent, or Firm* — Sughrue Mion, PLLC

(57) ABSTRACT

A camera control apparatus, a control method, and a non-transitory computer readable medium which are capable of, even when a plurality of authentication targets are detected, sequentially capturing images of the plurality of authentication targets efficiently in a short time. The camera control apparatus includes a processor configured to: detect a plurality of authentication targets from an image obtained by capturing a nearby environment; determine, for each of the plurality of authentication targets, a part of the image including the authentication target as an area; determine a state of the image of each of a plurality of the areas; and determine an order in which images of the plurality of authentication targets are captured.

15 Claims, 8 Drawing Sheets

(51) Int. Cl.
| | |
|---|---|
| *G06V 20/59* | (2022.01) |
| *G06V 40/16* | (2022.01) |
| *H04N 23/71* | (2023.01) |

(58) Field of Classification Search
USPC ................................. 348/148; 382/103, 118
See application file for complete search history.

(56) References Cited

U.S. PATENT DOCUMENTS

| | | | | |
|---|---|---|---|---|
| 2012/0300985 | A1* | 11/2012 | Ito ......................... | H04L 9/3231 |
| | | | | 382/103 |
| 2022/0360701 | A1* | 11/2022 | Dobashi ............... | H04N 23/611 |
| 2023/0206686 | A1* | 6/2023 | Matsunami ............. | G06F 21/32 |
| | | | | 382/118 |
| 2023/0289418 | A1* | 9/2023 | Yuki .................... | G06V 40/172 |
| 2024/0371121 | A1* | 11/2024 | Funayama ............. | G06V 40/18 |
| 2025/0157260 | A1* | 5/2025 | Takahashi ............ | A61B 5/1171 |

FOREIGN PATENT DOCUMENTS

| | | | |
|---|---|---|---|
| JP | 2008-311885 | A | 12/2008 |
| JP | 2010-085530 | A | 4/2010 |
| JP | 2010-183416 | A | 8/2010 |
| JP | 2012-033054 | A | 2/2012 |
| JP | 2014-042250 | A | 3/2014 |
| JP | 2017-049977 | A | 3/2017 |
| WO | 2019/187648 | A1 | 10/2019 |

OTHER PUBLICATIONS

JP Office Action for JP Application No. 2024-507325, mailed on Jul. 8, 2025 with English Translation.
JP Office Action for JP Application No. 2024-507325, mailed on Nov. 11, 2025 with English Translation.

* cited by examiner

CAMERA CONTROL APPARATUS, CONTROL METHOD, AND NON-TRANSITORY COMPUTER READABLE MEDIUM

This application is a National Stage Entry of PCT/JP2022/012070 filed on Mar. 16, 2022, the contents of all of which are incorporated herein by reference, in their entirety.

TECHNICAL FIELD

The present disclosure relates to a camera control apparatus, a control method, and a non-transitory computer readable medium, and in particular, to a camera control apparatus, a control method, and a non-transitory computer readable medium which are capable of, even when a plurality of authentication targets are detected, sequentially capturing images of the plurality of authentication targets efficiently in a short time.

BACKGROUND ART

Techniques for detecting a plurality of authentication targets from an image captured by a camera or the like and controlling the state of the image quality of the captured image based on the state of the image related to each of the authentication targets are known.

Patent Literature 1 discloses that obtaining an image transmitted, through a network, from any of at least one terminal having a function of capturing an image or obtaining an image from another device through the network; calculating a probability that the obtained image includes a certain imaging target; adding, if the probability is higher than a first threshold, information indicating the certain imaging target to the image; not adding, if the probability is lower than a second threshold, the information indicating the certain imaging target to the image; and transmitting, if the probability is equal to or higher than the second threshold and if the probability is equal to or lower than the first threshold, the image and request reception information for requesting addition of the information to the image to any of the at least one terminal through the network.

Patent Literature 2 discloses an imaging apparatus comprises: a personal face DB in which face image data relating to face images of a plurality of objects is registered; an imaging unit that images objects to generate image data; a face detection unit that detects face images from the generated image data, and compares and collates the detected face images with the face image data registered in the personal face DB; and an execution processing unit that executes imaging-related processing related to imaging of the objects by the imaging unit in accordance with the number of collated face images.

Patent Literature 3 discloses that a position of a camera, a direction of a lens, a focal distance, a field angle, and an aperture are acquired in the case of photographing a picture, a photographing space comprising a focal plane and a depth of field is calculated on the basis of the values above, an object is recognized by collating the photographing space with a position on a map, a plurality of photographing objects are ranked by measuring a distance from a photographing center, a measurement error of the camera position, and a measurement error in the lens direction, and then a photographer deletes and edits recognition results to practically carry out recognition of the object.

CITATION LIST

Patent Literature

Patent Literature 1: Japanese Unexamined Patent Application Publication No. 2017-049977
Patent Literature 2: Japanese Unexamined Patent Application Publication No. 2014-042250
Patent Literature 3: Japanese Unexamined Patent Application Publication No. 2004-328077

SUMMARY OF INVENTION

Technical Problem

When a control parameter of a camera control apparatus is automatically controlled, an image is captured in a state suitable for authentication of an authentication target, and a plurality of authentication targets are detected in an image (a video image), there is a problem that it becomes difficult to know which authentication target to focus on to control the camera.

An object of the present disclosure is to provide a camera control apparatus, a control method, and a non-transitory computer readable medium that solve the above-described problem.

Solution to Problem

A camera control apparatus according to the present disclosure includes:

detection means for detecting a plurality of authentication targets from an image obtained by capturing a nearby environment;

area determination means for determining, for each of the plurality of authentication targets, a part of the image including the authentication target as an area;

state determination means for determining a state of the image of each of a plurality of the areas;

order determination means for determining an order in which images of the plurality of authentication targets are captured based on a result of the determination about the state of the image of each of the plurality of the areas; and control means for setting a control parameter of the camera control apparatus for each of the plurality of the areas so that the state of the image of each of the areas becomes an optimum state for authentication of the authentication target in the area and controlling the camera control apparatus to capture an image of the authentication target in accordance with the order.

A camera control apparatus according to the present disclosure includes:

detection means for detecting faces of a plurality of persons from an image obtained by capturing a nearby environment;

grouping means for grouping the faces of the plurality of the persons based on sizes of the faces of the plurality of the persons, thereby generating a plurality of face groups;

state determination means for determining a state of the image of each of the plurality of face groups;

order determination means for determining an order of the plurality of face groups when images of the faces of the persons are captured based on a result of the determination about the state of the image of each of the plurality of face groups; and control means for uniformly setting a control parameter of the camera control apparatus for each of the plurality of face groups so that the state of the image of each of the faces of the plurality of the persons in each of the face groups becomes an optimum state for each of the face groups for authentication of the face of the person and controlling the camera control apparatus to capture images of the faces of the persons in each of the face groups in accordance with the order.

A control method according to the present disclosure includes:

detecting a plurality of authentication targets from an image obtained by capturing a nearby environment;

determining, for each of the plurality of authentication targets, a part of the image including the authentication target as an area;

determining a state of the image of each of a plurality of the areas;

determining an order in which images of the plurality of authentication targets are captured based on a result of the determination about the state of the image of each of the plurality of the areas; and setting a control parameter of a camera control apparatus for each of the plurality of the areas so that the state of the image of each of the areas becomes an optimum state for authentication of the authentication target in the area and controlling the camera control apparatus to capture an image of the authentication target in accordance with the order.

A non-transitory computer readable medium according to the present disclosure stores a program for causing a computer to:

detect a plurality of authentication targets from an image obtained by capturing a nearby environment;

determine, for each of the plurality of authentication targets, a part of the image including the authentication target as an area;

determine a state of the image of each of a plurality of the areas;

determine an order in which images of the plurality of authentication targets are captured based on a result of the determination about the state of the image of each of the plurality of the areas; and set a control parameter of a camera control apparatus for each of the plurality of the areas so that the state of the image of each of the areas becomes an optimum state for authentication of the authentication target in the area and control the camera control apparatus to capture an image of the authentication target in accordance with the order.

Advantageous Effects of Invention

According to the present disclosure, it is possible to provide a camera control apparatus, a control method, and a non-transitory computer readable medium which are capable of, even when a plurality of authentication targets are detected, sequentially capturing images of the plurality of authentication targets efficiently in a short time.

EXAMPLE EMBODIMENT

Example embodiments of the present disclosure will be described below with reference to the drawings. The same or corresponding elements are denoted by the same reference symbols throughout the drawings, and redundant descriptions thereof will be omitted as necessary for the clarification of the description.

FIRST EXAMPLE EMBODIMENT

Configuration

Figure 1:
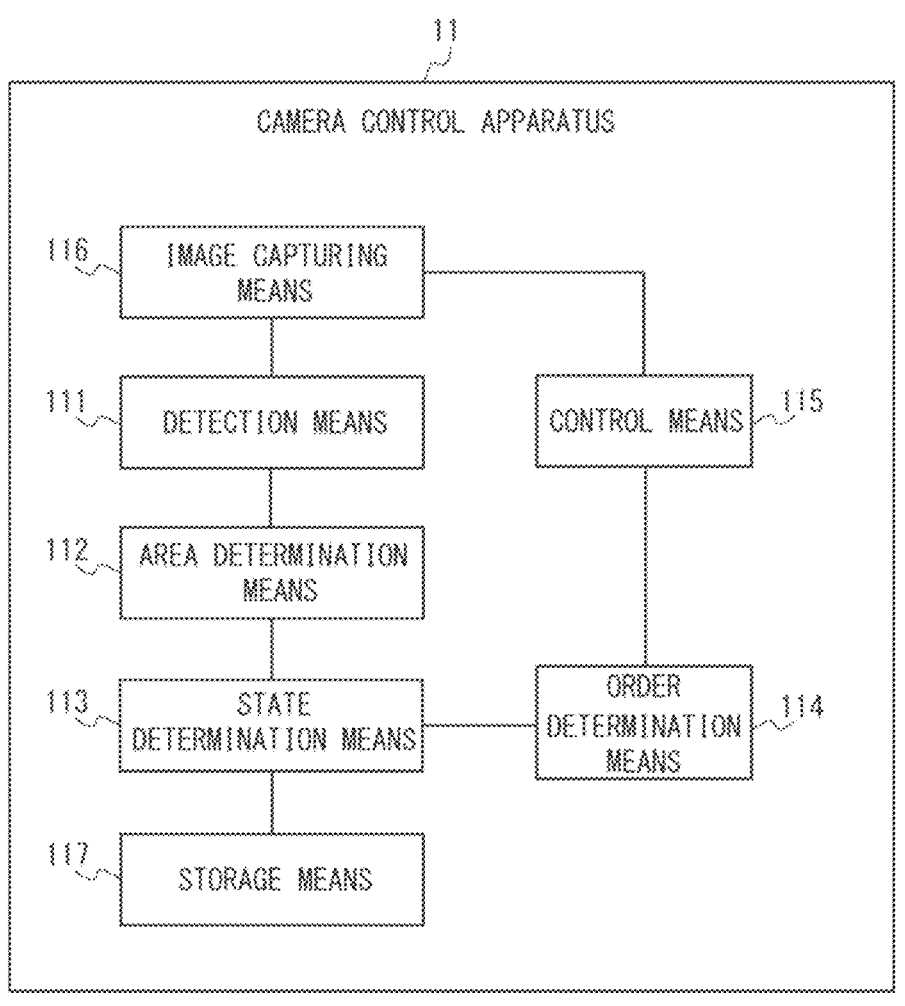
FIG. 1 is a block diagram showing an example of a camera control apparatus according to a first example embodiment.

FIG. 1 is a block diagram showing an example of a camera control apparatus according to a first example embodiment.

Figure 2:
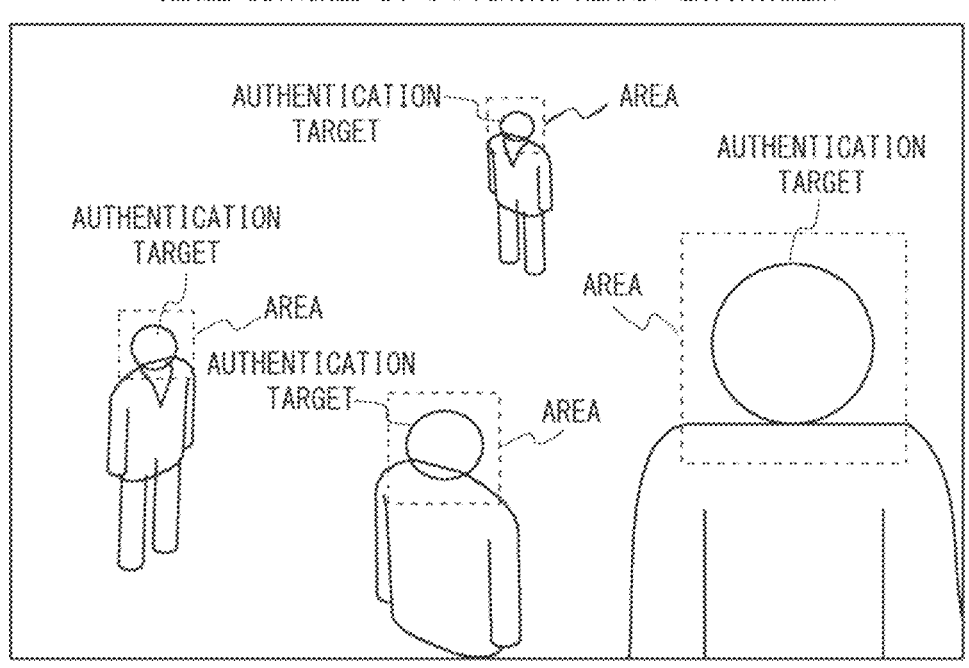
FIG. 2 is a schematic diagram showing an example of an image captured by image capturing means according to the first example embodiment.

FIG. 2 is a schematic diagram showing an example of an image captured by image capturing means according to the first example embodiment.

As shown in FIG. 1, a camera control apparatus 11 according to the first example embodiment includes detection means 111, area determination means 112, state determination means 113, order determination means 114, control means 115, image capturing means 116, and storage means 117.

As shown in FIG. 2, the detection means 111 detects a plurality of authentication targets from an image obtained by capturing a nearby environment. Although four authentication targets are shown as an example in FIG. 2, the number of authentication targets is not limited thereto. The number of authentication targets in the first example embodiment may be other than four.

The area determination means 112 determines, for each of the plurality of authentication targets, a part of the image including the authentication target as an area.

The state determination means 113 determines a state of the image of each of a plurality of the areas. The state of the image is, for example, at least one of an average value of luminance values of the image, dispersion in the luminance values, a standard deviation of the luminance values, and a histogram of the luminance values. For example, the state determination means 113 determines a size of the face of a person based on the states (an average value of luminance values of the image, dispersion in the luminance values, a standard deviation of the luminance values, and a histogram of the luminance values) of the images of the plurality of the areas.

The order determination means 114 determines an order (a priority order) in which images of the plurality of authentication targets are captured based on a result of the determination about the size of the face of each of the plurality of authentication targets. For example, the order determination means 114 determines, based on the determined sizes of the faces of the persons, an order in which images of the faces of the plurality of persons are captured to be a descending order of the sizes of the faces of the plurality of persons.

The control means 115 sets a control parameter of the camera control apparatus 11 for each of the plurality of the areas so that the state of the image of each of the areas becomes an optimum state for authentication of the authentication target in the area and controls the camera control apparatus 11 to capture an image of the authentication target in accordance with the determined order.

The control parameter of the camera control apparatus 11 is, for example, at least one of an exposure time, a sensitivity, and a contrast. The exposure refers to the amount of light captured when an image is captured. The sensitivity, which is an index of how much light that has entered the image capturing means 116 is amplified in the image capturing means 116, may be referred to as a gain. The contrast refers to a difference between lightness in a light area and that in a dark area of an image. When the aforementioned difference is large, it may be said that the image has a high contrast. As the contrast becomes higher, the light area becomes lighter and the dark area becomes darker, and as a result, the color of the image becomes more sharply defined.

The control means 115 can change the state of the image by setting a control parameter. The control means 115 can bring the state of the image into an optimum state for authentication of the authentication target by appropriately setting a control parameter. The control means 115 appropriately sets, for example, an exposure time, a sensitivity, and a contrast, whereby the camera control apparatus 11 can set an average value of luminance values of the image, dispersion in the luminance values, a standard deviation of the luminance values, and a histogram of the luminance values to optimum values for authentication of the authentication target.

The control means 115 may acquire in advance a control parameter by which the state of the image becomes an optimum state for authentication of the authentication target in the area. The storage means 117 stores the control parameter by which the state of the image becomes an optimum state for authentication of the authentication target in the area.

The image capturing means 116 captures an image of a nearby environment. The storage means 117 stores the image obtained by capturing the nearby environment.

In a first frame, which is a first image capturing period (an image capturing time), the control means 115 sets a control parameter so that a state of the image of one of a plurality of areas becomes an optimum state for authentication, and controls the image capturing means 116 to capture an image of the authentication target. The image capturing means 116 captures an image of the authentication target in the first frame under the control of the control means 115. Further, in a second frame after the first frame, the control means 115 sets a control parameter so that a state of the image of another one of the plurality of areas becomes an optimum state for authentication, and controls the image capturing means 116 to capture an image of the authentication target. The image capturing means 116 captures an image of the authentication target in the second frame under the control of the control means 115. In this manner, the camera control apparatus 11 sets a control parameter for each frame and captures an image of the authentication target.

Effect

The camera control apparatus 11 according to the first example embodiment determines, based on states (e.g., an average value of luminance values of the image, dispersion in the luminance values, a standard deviation of the luminance values, and a histogram of the luminance values) of the images of a plurality of areas, a size of the face of each of persons in the images of the areas. The camera control apparatus 11 determines, based on a result of the determination, for example, the determined sizes of the faces of the persons, a descending order of the sizes of the faces of the persons as an order in which images of the faces of a plurality of persons are captured. The camera control apparatus 11 sets a control parameter for each of the plurality of areas so that the state of the image of each of the areas becomes an optimum state for authentication of the authentication target in the area and captures an image of the authentication target in accordance with the determined order. Thus, according to the first example embodiment, images of a plurality of authentication targets can be sequentially captured in an optimum state for authentication without the need to determine which authentication target to focus on when the images of the authentication targets are captured.

As a result, according to the first example embodiment, it is possible to provide a camera control apparatus, a control method, and a non-transitory computer readable medium which are capable of, even when a plurality of authentication targets are detected, sequentially capturing images of the plurality of authentication targets efficiently in a short time.

Note that the camera control apparatus 11 may limit an authentication target to an object present near the camera control apparatus 11. Further, the camera control apparatus 11 may limit an authentication target to the face of a person or the whole body of a person.

SECOND EXAMPLE EMBODIMENT

Configuration

Figure 3:
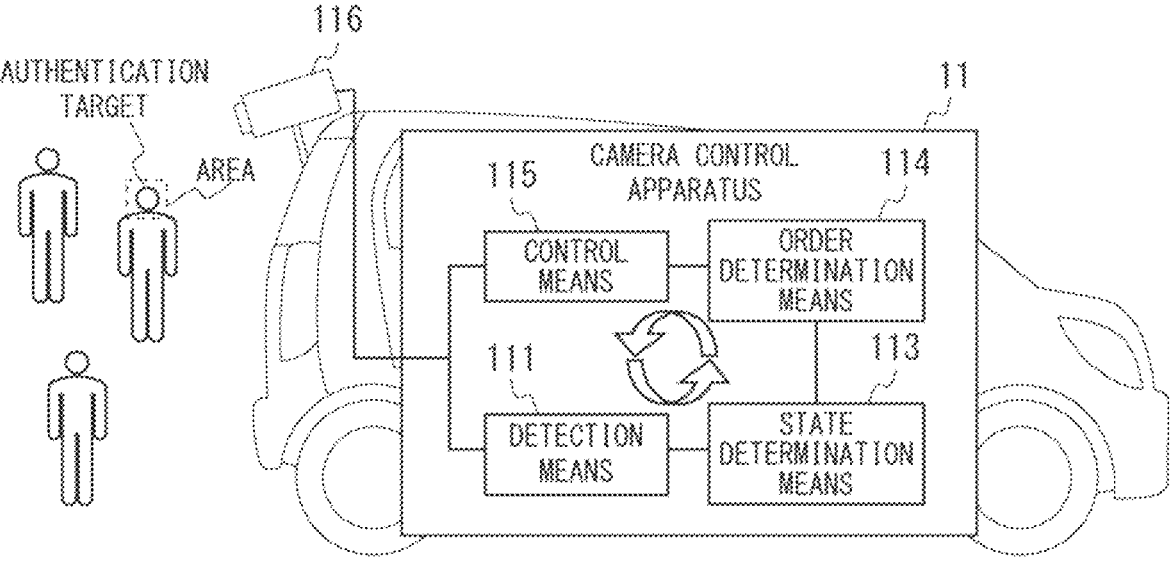
FIG. 3 is a block diagram showing an example of a camera control apparatus according to a second example embodiment.

FIG. 3 is a block diagram showing an example of a camera control apparatus according to a second example embodiment.

FIG. 3 shows a case in which the camera control apparatus is mounted on a vehicle and an authentication target is limited to the face of a person.

In FIG. 3, the area determination means 112 and the storage means 117 are omitted in order to make the description simple. Further, "detection means" is referred to as "face detection means" in order to limit an authentication target to the face of a person.

The second example embodiment differs from the first example embodiment in that an authentication target is limited to "the face of a person". Therefore, the area determination means 112 determines a part of an image including the face of a person as an area, the image being obtained by capturing a nearby environment.

The second example embodiment is mainly intended to solve a problem that, in a case in which a control parameter of a camera (image capturing means) is automatically controlled so that an image suitable for face authentication can be captured, when a plurality of faces are detected in the image (video image), it is not possible to know which face to focus on to control the camera.

As shown in FIG. 3, face detection means 111 of the camera control apparatus 11 detects the faces of a plurality of persons from an image obtained by capturing a nearby environment.

The area determination means 112 (omitted in FIG. 3) determines, for each of the faces of the plurality of persons, a part of the image including the face of the person as an area.

The state determination means 113 determines a state of the image of each of a plurality of areas. Specifically, with regard to the determination of the state of the image of each of the plurality of areas, the state determination means 113 determines a size of the face of the person in the area; that is, how large the face of the person is. Further, the state determination means 113 determines a state of the brightness of the detected face of the person. Further, the state determination means 113 may determine a result of authentication processing of the person as a state of authentication.

The order determination means 114 determines an order in which images of the faces of the plurality of persons are captured based on a result of the determination about the size of the face of each of the plurality of persons made by the state determination means 113. Specifically, when the state determination means 113 has determined how large the face of the person is, the order determination means 114 sets an order in which images of the faces of the persons are captured to be a descending order of the sizes of the faces of the plurality of persons.

The control means 115 sets a control parameter of the camera control apparatus 11 for each of the plurality of areas so that the state of the image of each of the areas becomes an optimum state for face authentication of the face of the person in the area and controls the camera control apparatus 11 to capture an image of the face of the person in accordance with the order determined by the order determination means 114. That is, the control means 115 determines based on which face of the person it controls the control parameter of the image capturing means 116 in accordance with a result of the determination by the state determination means 113. The control means 115 controls the image capturing means 116 (e.g., a camera) so that an image of the face of a person can be captured optimally.

Further, the order determination means 114 prioritizes a target to be captured based on the state of a subject (the size, the direction, and the brightness of the face when it is the face of a person), and the control means 115 controls the image capturing means 116 by a control parameter so that the target to be captured is most easily recognized.

The above descriptions can be summarized as follows: in the camera control apparatus 11, the face detection means 111 detects the faces of persons, the order determination means 114 determines an order (a priority order) in which images of the faces of the persons are captured, the control means 115 controls a control parameter for each frame in accordance with the order, and the image capturing means 116 captures an image of the face of each of the persons for each frame.

Examples 1 to 6 of an order determination method performed by the order determination means 114 will be shown below. However, the order determination method is not limited to these Examples.

8

EXAMPLE 1

The order determination means 114 determines an order in which images of the faces of a plurality of persons are captured to be a descending order of the sizes of the faces of the plurality of persons. The fact that "the size of the face of the person is large" is considered to be equivalent to the fact that "a distance between the person and the image capturing means 116, for example, the camera, is short". Therefore, a "descending order of the respective sizes of the faces of the plurality of persons" can be used instead of an "ascending order of the respective distances between the plurality of persons and the camera". Even when the distance between the face of the person and the camera is not measured using a distance measurement sensor or the like, the "descending order of the respective sizes of the faces of the plurality of persons" can be used for the "ascending order of the respective distances between the plurality of persons and the camera".

EXAMPLE 2

The order determination means 114 determines an order in which images of the faces of a plurality of persons are captured to be an order in which the direction of the face of each of the persons is closer to the front direction. The fact that "the direction of the face of the person is closer to the front direction" is considered to be equivalent to the fact that "the person is about to get into a vehicle" when viewed from a camera provided on the driver's side of the vehicle. Therefore, in some cases, an "order in which the direction of the face of the person is closer to the front direction" can be used instead of an "order in which the person is about to get into a vehicle".

EXAMPLE 3

The control means 115 performs authentication processing for a person in advance before a control parameter is set for each area in accordance with the Further, the order determination means 114 acquires an authentication order. score of the person as a result of the authentication processing performed in advance. The order determination means 114 determines an order in which images of the faces of a plurality of persons are captured to be a descending order of the authentication scores. When "the authentication score of a person is high", it is likely that "the person is a legitimate user". Therefore, by determining an order in which images of the faces of a plurality of persons are captured to be a descending order of the authentication scores, face authentication can be performed for a larger number of legitimate users.

Note that when there is an unauthenticated person for whom the authentication processing has not been performed, the order determination means 114 may adjust the order in which images of the faces of the plurality of persons are captured so that the order of an image of the face of the unauthenticated person is moved up by a predetermined number.

EXAMPLE 4

The order determination means 114 determines an order in which image of the faces of a plurality of persons are captured to be an order in which the brightness of each of the faces is closer to that suitable for face authentication. Since the order determination means 114 does not need to perform control when the brightness of a face is already a brightness suitable for face authentication, the face may be excluded from targets to be controlled. By doing so, the control time can be reduced, and thus the overall authentication time can be reduced.

EXAMPLE 5

When an image of the face of a person is captured by a camera provided on a driver's side of a vehicle, the order determination means 114 adjusts the order in which images of the faces of a plurality of persons are captured so that the order of an image of the face of the person captured by the camera provided on the driver's side is moved up by a predetermined number. The camera provided on the driver's side of the vehicle is a camera which is expected to be closest to a person who is about to get into the vehicle. Therefore, by preferentially authenticating the face of a person detected by the camera provided on the driver's side of the vehicle, the face of the person can be authenticated before the person rides in the vehicle.

EXAMPLE 6

The order determination means 114 determines the order in which the faces of a plurality of persons are captured to be an ascending order of the distances with a smart key of a vehicle owned by the person (the distances between the smart key and the camera control apparatus 11). This determination of the order is performed in accordance with the position of a smart key.

Operation 1

Figure 4:
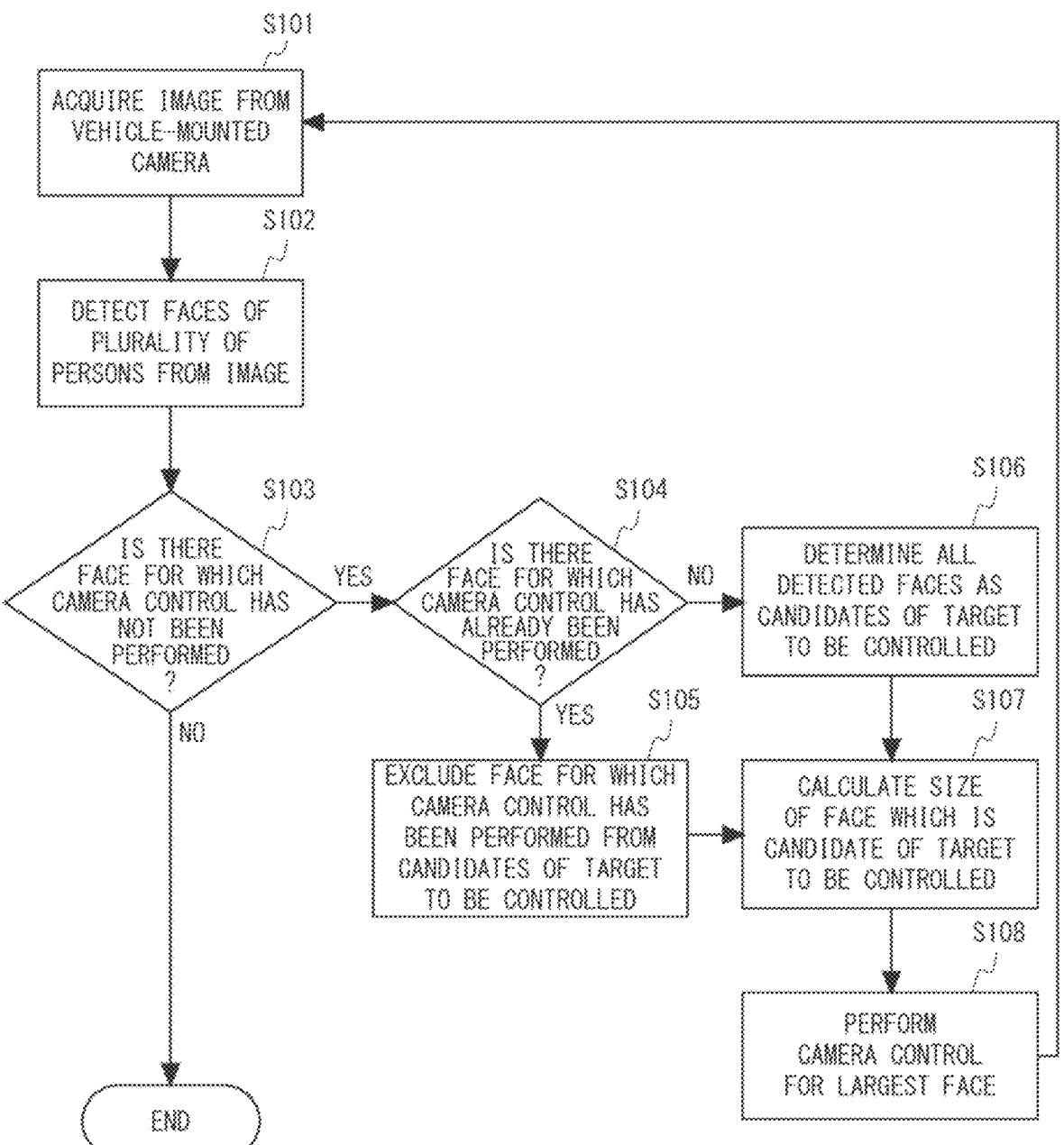
FIG. 4 is a flowchart showing an example of operations performed by the camera control apparatus according to the second example embodiment.

FIG. 4 is a flowchart showing an example of operations performed by the camera control apparatus according to the second example embodiment.
FIG. 4 shows operations for determining a priority order (an order in which images are captured) based on a size of the face when no authentication processing is performed.
As shown in FIG. 4, the face detection means 111 acquires an image from a vehicle-mounted camera (the image capturing means 116) (Step S101).
The face detection means 111 detects the faces of a plurality of persons from the acquired image (Step S102).
The control means 115 checks whether or not there is the face of a person for which camera control has not been performed (Step S103). That is, the control means 115 checks whether or not there is a vehicle-mounted camera in which a control parameter for controlling the camera is not set or is not input.
When the face of a person for which camera control has not been performed is not present (Step S103: No), the control means 115 ends the operation.
When the face of a person for which camera control has not been performed is present (Step S103: Yes), the control means 115 checks whether or not there is the face for which camera control has already been performed (Step S104).
When the face for which camera control has already been performed is present (Step S104: Yes), the control means 115 excludes the face of the person for which camera control has been performed from the candidates of the target to be controlled (Step S105), and the process proceeds to Step S107.
When the face for which camera control has already been performed is not present (Step S104: No), the control means 115 determines all the detected faces of persons as the candidates of the target to be controlled (Step S106), and the process proceeds to Step S107.
The state determination means 113 calculates a size of the face of the person which is the candidate of the target to be controlled (Step S107). That is, the state determination means 113 calculates a state of the image of the face of the person which is the candidate of the target to be controlled in each of a plurality of areas, in this case, a size of the face of the person, and determines how large the face of the person is.
The control means 115 performs camera control for the largest face of the person (Step S108), and the process proceeds to Step S101. Note that the camera control refers to setting a control parameter so that the state of the image of each of the plurality of areas becomes an optimum state for face authentication of the face of the person in the area and controlling the camera control apparatus to capture an image of the face of the person.

Operation 2

Figure 5:
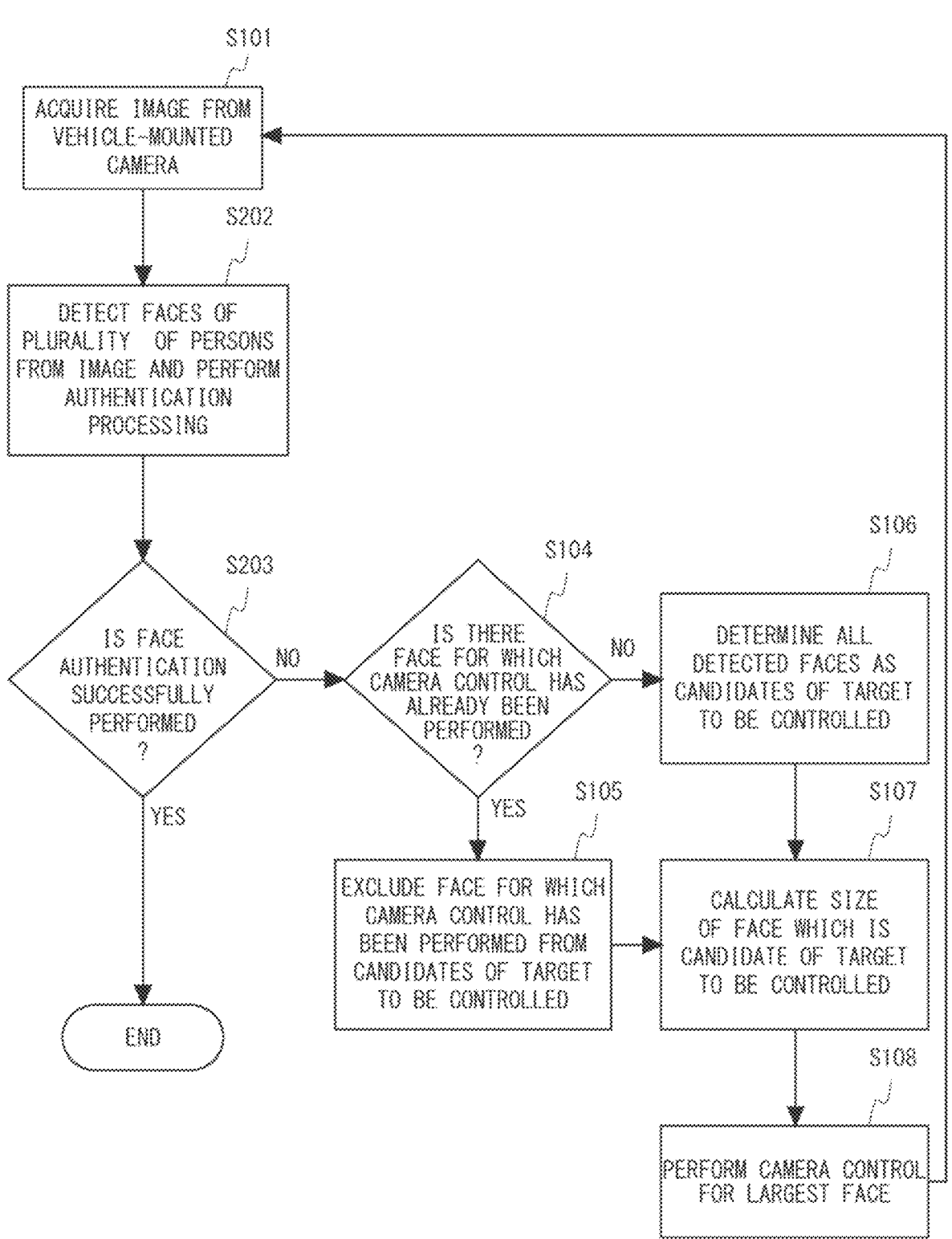
FIG. 5 is a flowchart showing an example of operations performed by the camera control apparatus according to the second example embodiment.

FIG. 5 is a flowchart showing an example of operations performed by the camera control apparatus according to the second example embodiment.
FIG. 5 shows operations for determining a priority order based on a size of a face when authentication processing is performed.
As shown in FIG. 5, the face detection means 111 acquires an image from a vehicle-mounted camera (the image capturing means 116) (Step S101).
The face detection means 111 detects the faces of a plurality of persons from the acquired image and performs authentication processing (Step S202).
The control means 115 checks whether or not the face authentication is successfully performed (Step S203).
When the face authentication is successfully performed (Step S203: Yes), the control means 115 ends the operation.
When the face authentication is not successfully performed (Step S103: No), the control means 115 checks whether or not there is the face of a person for which camera control has already been performed (Step S104).
The subsequent operations of Steps S105 to 108 are similar to those shown in FIG. 4, and thus the descriptions thereof will be omitted.

Operation 3

Figure 6:
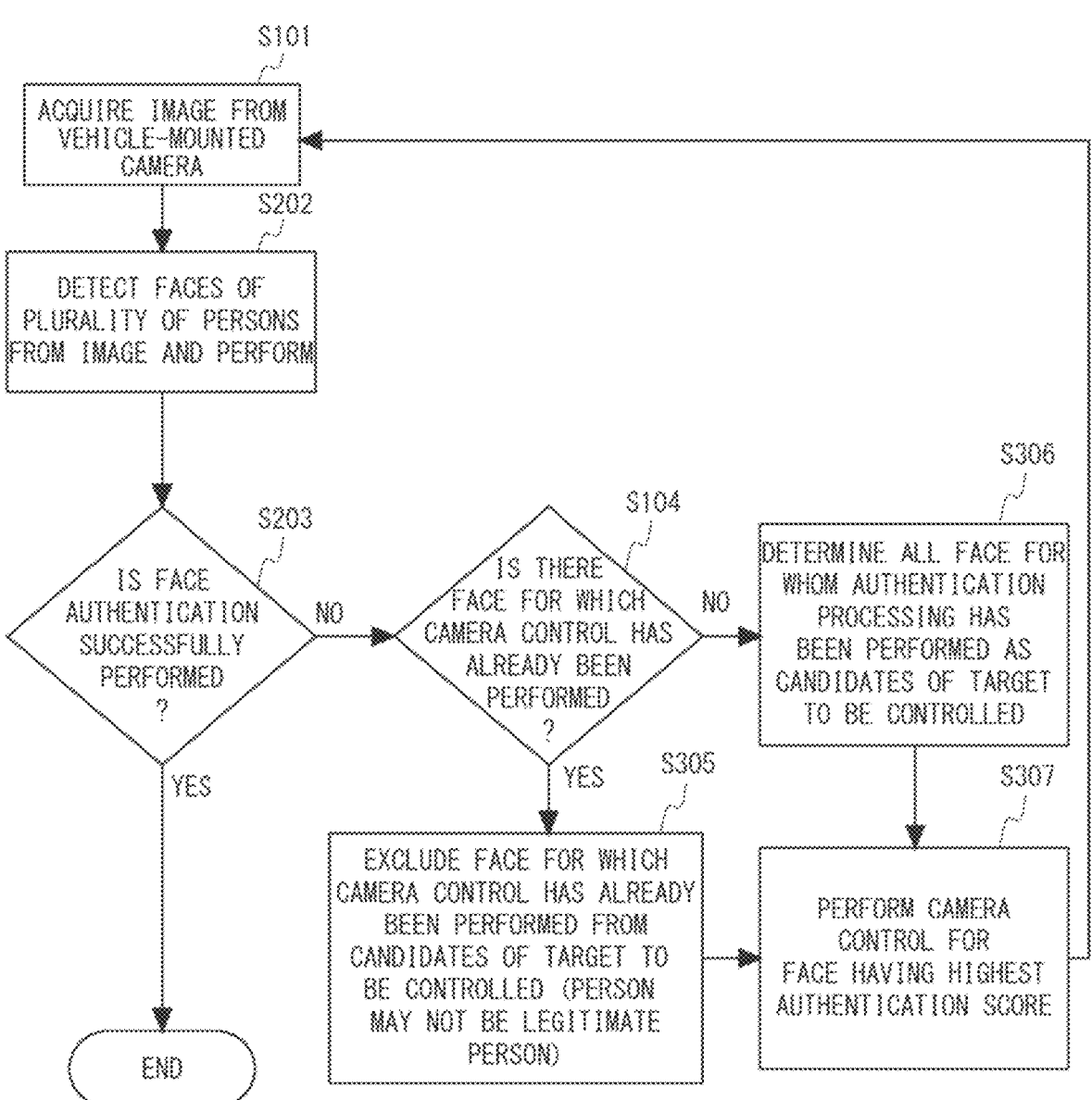
FIG. 6 is a flowchart showing an example of operations performed by the camera control apparatus according to the second example embodiment.

FIG. 6 is a flowchart showing an example of operations performed by the camera control apparatus according to the second example embodiment.
FIG. 6 shows operations for determining a priority order based on an authentication score when authentication processing is performed.
The operations of Steps S101, S202, S203, and S104 are similar to those shown in FIG. 5, and thus the descriptions thereof will be omitted.
When the face of a person for which camera control has already been performed is present (Step S104: Yes), the control means 115 excludes the face of the person for which camera control has already been performed from the targets to be controlled (Step S305). The operation of Step S305 is an operation for excluding a person whose face is not successfully authenticated (see Step S203) from the targets to be controlled since such a person may not be a legitimate person.
When the face of a person for which camera control has already been performed is not present (Step S104: No), the control means 115 determines all the faces of persons for whom the authentication processing has been performed as the candidates of the target to be controlled (Step S306).

After Step S305 or Step S306, the order determination means 114 acquires an authentication score, and determines the order in which images of the faces of the persons are captured to be a descending order of the authentication scores. The control means 115 performs camera control for the face of the person having a highest authentication score (Step S307).

After Step S307, the process returns to Step S101.

THIRD EXAMPLE EMBODIMENT

Configuration

Figure 7:
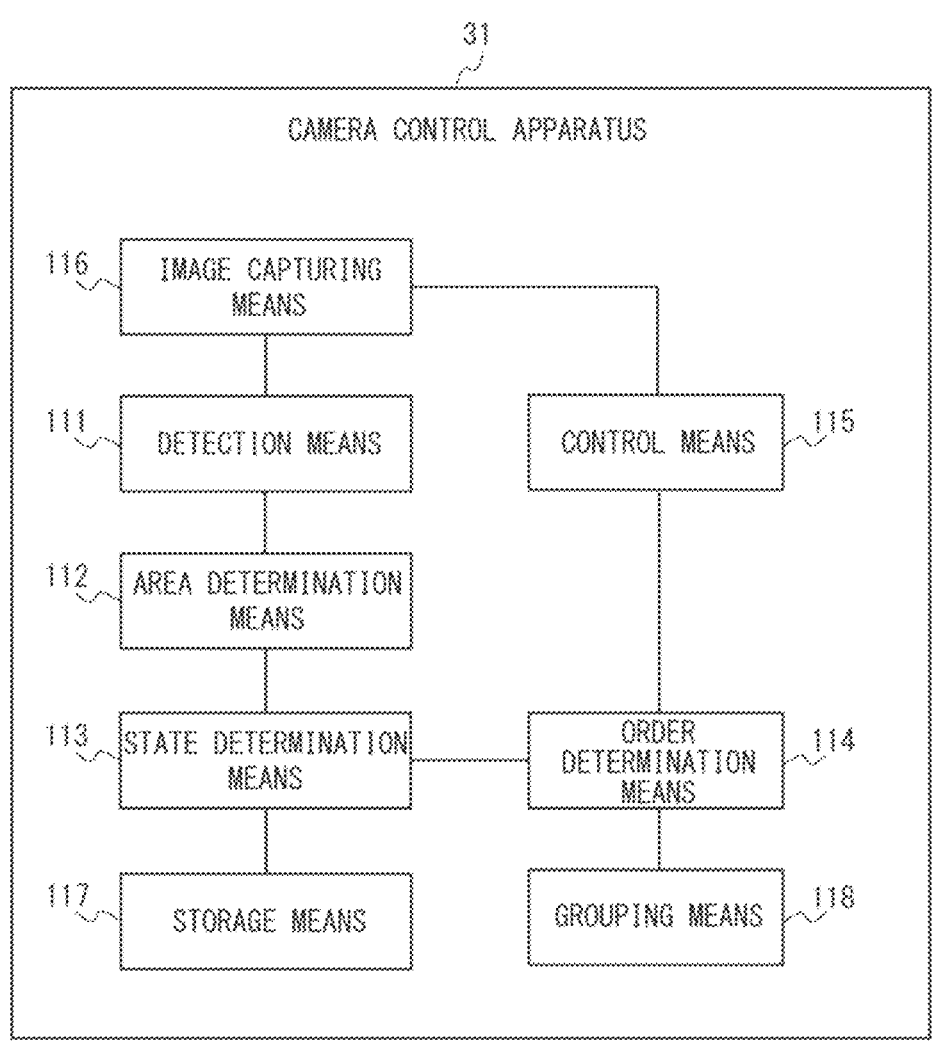
FIG. 7 is a block diagram showing an example of a camera control apparatus according to a third example embodiment.

FIG. 7 is a block diagram showing an example of a camera control apparatus according to a third example embodiment.

Figure 8:
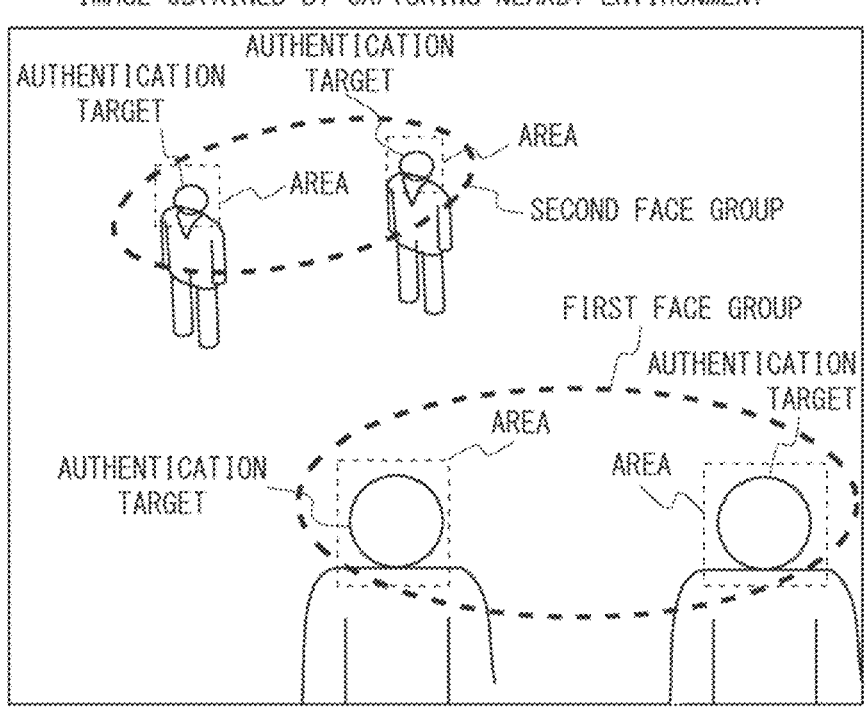
FIG. 8 is a schematic diagram showing an example of grouping of faces of a plurality of persons according to the third example embodiment.

FIG. 8 is a schematic diagram showing an example of grouping of faces of a plurality of persons according to the third example embodiment.

As shown in FIGS. 7 and 8, a camera control apparatus 31 according to the third example embodiment is different from that according to the first example embodiment in that it further includes grouping means 118 for grouping the faces of a plurality of persons based on the size of the face of the person, thereby generating a plurality of face groups. Note that the grouping of the faces of a plurality of persons based on the size of the face of the person is one example, and the present disclosure is not limited thereto. Further, in the third example embodiment, an example of a case in which an authentication target is the face of a person will be described.

The configuration of the camera control apparatus 31 according to the third example embodiment is similar to that of the camera control apparatus according to the first example embodiment except that the grouping means 118 is included. The grouping means 118 defines, for example, a plurality of persons whose faces are roughly the same in size and whose faces are facing in the front direction as a first face group. Further, the grouping means 118 defines, for example, a plurality of persons whose faces are roughly the same in size and whose faces are facing in a direction different from the front direction by a predetermined angle as a second face group. Although two groups, i.e., the first face group and the second face group, are shown as an example in FIG. 8, the number of face groups is not limited thereto. In the third example embodiment, any number of face groups other than two can be applied.

As shown in FIG. 7, the detection means 111 detects the faces of a plurality of persons from an image obtained by capturing a nearby environment. The state determination means 113 determines a state of the image of each of a plurality of face groups.

The order determination means 114 determines an order of the plurality of face groups when images of the faces of the persons are captured based on a result of the determination about the state of the image of each of the plurality of face groups. When images of the faces of the persons are captured, the order determination means 114 determines the order in which images of the faces of the persons are captured to be to a descending order of the sizes of the faces of the persons for each group.

The control means 115 uniformly sets a control parameter of the camera control apparatus 31 for each of the plurality of face groups so that the state of the image of each of the faces of the plurality of persons in each of the face groups becomes an optimum state for each of the face groups for face authentication of the face of the person and controlling the camera control apparatus 31 to capture images of the faces of the persons in each of the face groups in accordance with the order. The control means 115 can determine a subject for each group by grouping the detected faces of the persons based on the states thereof. Therefore, camera control can be performed for the faces of a plurality of persons simultaneously.

The camera control apparatus 31 can efficiently capture an image suitable for authentication by performing camera control for each group. Thus, the authentication time can be reduced.

Note that, depending on the states of the detected faces of the plurality of persons, it may be determined to exclude the face of the person from the targets to be controlled. Specifically, when the size of the face of a person is smaller than a predetermined size, the camera control apparatus 31 may exclude the face of the person from the targets to be controlled and not perform camera control. Further, when the face of a person is facing in a direction different from a straight front direction by a predetermined angle or more, the camera control apparatus 31 may exclude the face of the person from the targets to be controlled and not perform camera control.

Further, when the authentication processing (including both acceptance and rejection) for a person is completed, the control parameter of the image capturing means (the camera) may be controlled using information about the whole image. Further, when a person is newly detected, switching may be performed so that information about the person is used again.

Further, when there is the face of a person rejected as a result of the authentication processing, the number of the rejections may be counted. When the number of the rejections exceeds a predetermined threshold, the face of the person may be excluded from the targets to be controlled by control parameters and the authentication targets.

Note that, although the present disclosure has been described as a hardware configuration in the above example embodiments, the present disclosure is not limited thereto. In the present disclosure, processing of each component may also be implemented by causing a Central Processing Unit (CPU) to execute a computer program.

In the above example embodiments, the program can be stored and provided to a computer using any type of non-transitory computer readable media. Non-transitory computer readable media include any type of tangible storage media. Examples of non-transitory computer readable media include magnetic storage media (specifically, a flexible disk, a magnetic tape, and a hard disk drive), optical magnetic storage media (specifically, a magneto-optical disk), a CD-ROM (Read Only Memory), a CD-R, a CD-R/W, and semiconductor memories (specifically, a mask ROM, a PROM (Programmable ROM), an EPROM (Erasable PROM), a flash ROM, and an RAM (Random Access Memory)). The program may be provided to a computer using any type of transitory computer readable media. Examples of transitory computer readable media include an electric signal, an optical signal, and an electromagnetic wave. Transitory computer readable media can provide the program to a computer via a wired communication line (e.g., electric wires, and optical fibers) or a wireless communication line.

Although the present disclosure has been described above with reference to example embodiments, the present disclosure is not limited to the above-described example embodiments. Various changes that can be understood by those skilled in the art can be made to the configuration and the details of the present disclosure within the scope of the invention.

Note that the present disclosure is not limited to the above-described example embodiments and may be changed as appropriate without departing from the scope and spirit of the present disclosure.

The whole or part of the example embodiments disclosed above can be described as, but not limited to, the following supplementary notes.

Supplementary Note 1

A camera control apparatus comprising:

detection means for detecting a plurality of authentication targets from an image obtained by capturing a nearby environment;

area determination means for determining, for each of the plurality of authentication targets, a part of the image including the authentication target as an area;

state determination means for determining a state of the image of each of a plurality of the areas;

order determination means for determining an order in which images of the plurality of authentication targets are captured based on a result of the determination about the state of the image of each of the plurality of the areas; and control means for setting a control parameter of the camera control apparatus for each of the plurality of the areas so that the state of the image of each of the areas becomes an optimum state for authentication of the authentication target in the area and controlling the camera control apparatus to capture an image of the authentication target in accordance with the order.

Supplementary Note 2

The camera control apparatus according to supplementary note 1, wherein the control means acquires in advance the control parameter by which the state of the image becomes an optimum state for authentication of the authentication target in the area.

Supplementary Note 3

The camera control apparatus according to supplementary note 1 or 2, wherein the state of the image includes at least one of an average value of luminance values of the image, dispersion in the luminance values, a standard deviation of the luminance values, and a histogram of the luminance values.

Supplementary Note 4

The camera control apparatus according to any one of supplementary notes 1 to 3, wherein the control parameter includes at least one of an exposure time, a sensitivity, and a contrast.

Supplementary Note 5

The camera control apparatus according to any one of supplementary notes 1 to 4, wherein the control means sets the control parameter so that a state of the image of one of the plurality of the areas becomes an optimum state for authentication in a first frame, and sets the control parameter so that a state of the image of another one of the plurality of the areas becomes an optimum state for authentication in a second frame after the first frame.

Supplementary Note 6

The camera control apparatus according to any one of supplementary notes 1 to 5, further comprising image capturing means for capturing an image of the nearby environment.

Supplementary Note 7

The camera control apparatus according to any one of supplementary notes 1 to 6, further comprising storage means for storing the image obtained by capturing the nearby environment.

Supplementary Note 8

The camera control apparatus according to any one of supplementary notes 1 to 7, wherein the authentication target is limited to a face of a person.

Supplementary Note 9

The camera control apparatus according to supplementary note 8, wherein the order determination means determines the order in which images of the faces of a plurality of the persons are captured to be a descending order of the sizes of the faces of the plurality of the persons.

Supplementary Note 10

The camera control apparatus according to supplementary note 8, wherein the order determination means determines the order in which images of the faces of the plurality of the persons are captured to be an order in which a direction of the face of each of the persons is closer to a front direction.

Supplementary Note 11

The camera control apparatus according to supplementary note 8, wherein the control means performs authentication processing for the person before the control parameter is set for each of the areas in accordance with the order, the order determination means acquires an authentication score as a result of the authentication processing, and the order determination means determines the order in which images of the faces of the plurality of the persons are captured to be a descending order of the authentication scores instead of determining the order in which images of the faces of the plurality of the persons are captured based on the result of the determination.

Supplementary Note 12

The camera control apparatus according to supplementary note 11, wherein when there is an unauthenticated person for whom the authentication processing has not been performed, the order determination means adjusts the order in which images of the faces of the plurality of the persons are captured so that the order of an image of the face of the unauthenticated person is moved up by a predetermined number.

Supplementary Note 13

The camera control apparatus according to supplementary note 8, wherein the order determination means determines the order in which images of the faces of the plurality of the persons are captured to be an order in which a brightness of each of the faces is closer to a brightness suitable for face authentication.

Supplementary Note 14

The camera control apparatus according to supplementary note 8, wherein when a face of a person is captured by a camera provided on a driver's side of a vehicle, the order determination means adjusts the order in which images of the faces of the plurality of the persons are captured so that the order of an image of the face of the person captured by the camera provided on the driver's side is moved up by a predetermined number instead of determining the order in which images of the faces of the plurality of the persons are captured based on the result of the determination.

Supplementary Note 15

The camera control apparatus according to supplementary note 8, wherein the order determination means determines the order in which images of the faces of the plurality of the persons are captured to be an ascending order of distances between a smart key of a vehicle owned by the person and the camera control apparatus instead of determining the order in which images of the faces of the plurality of the persons are captured based on the result of the determination.

Supplementary Note 16

A camera control apparatus comprising:
detection means for detecting faces of a plurality of persons from an image obtained by capturing a nearby environment;
grouping means for grouping the faces of the plurality of the persons based on sizes of the faces of the plurality of the persons, thereby generating a plurality of face groups;
state determination means for determining a state of the image of each of the plurality of face groups;
order determination means for determining an order of the plurality of face groups when images of the faces of the persons are captured based on a result of the determination about the state of the image of each of the plurality of face groups; and
control means for uniformly setting a control parameter of the camera control apparatus for each of the plurality of face groups so that the state of the image of each of the faces of the plurality of the persons in each of the face groups becomes an optimum state for each of the face groups for authentication of the face of the person and controlling the camera control apparatus to capture images of the faces of the persons in each of the face groups in accordance with the order.

Supplementary Note 17

A control method comprising:
detecting a plurality of authentication targets from an image obtained by capturing a nearby environment;

determining, for each of the plurality of authentication targets, a part of the image including the authentication target as an area;
determining a state of the image of each of a plurality of the areas;
determining an order in which images of the plurality of authentication targets are captured based on a result of the determination about the state of the image of each of the plurality of the areas; and
setting a control parameter of a camera control apparatus for each of the plurality of the areas so that the state of the image of each of the areas becomes an optimum state for authentication of the authentication target in the area and controlling the camera control apparatus to capture an image of the authentication target in accordance with the order.

Supplementary Note 18

A non-transitory computer readable medium storing a program for causing a computer to:
detect a plurality of authentication targets from an image obtained by capturing a nearby environment;
determine, for each of the plurality of authentication targets, a part of the image including the authentication target as an area;
determine a state of the image of each of a plurality of the areas;
determine an order in which images of the plurality of authentication targets are captured based on a result of the determination about the state of the image of each of the plurality of the areas; and
set a control parameter of a camera control apparatus for each of the plurality of the areas so that the state of the image of each of the areas becomes an optimum state for authentication of the authentication target in the area and control the camera control apparatus to capture an image of the authentication target in accordance with the order.

REFERENCE SIGNS LIST

11, 31: CAMERA CONTROL APPARATUS
111: DETECTION MEANS, FACE DETECTION MEANS
112: AREA DETERMINATION MEANS
113: STATE DETERMINATION MEANS
114: ORDER DETERMINATION MEANS
115: CONTROL MEANS
116: IMAGE CAPTURING MEANS
117: STORAGE MEANS
118: GROUPING MEANS

What is claimed is:
1. A camera control apparatus comprising:
at least one memory storing instructions, and
at least one processor configured to execute the instructions to:
detect a plurality of authentication targets from an image obtained by capturing a nearby environment;
determine, for each of the plurality of authentication targets, a part of the image including the authentication target as an area;
determine a state of the image of each of a plurality of the areas;
determine an order in which images of the plurality of authentication targets are captured based on a result of the determination about the state of the image of each of the plurality of the areas; and set a control parameter of the camera control apparatus for each of the plurality of the areas so that the state of the image of each of the areas becomes an optimum state for authentication of the authentication target in the area and control the camera control apparatus to capture an image of the authentication target in accordance with the order, wherein the authentication target is limited to a face of a person, and the at least one processor is further configured to execute the instructions to determine the order in which images of the faces of a plurality of the persons are captured to be a descending order of the sizes of the faces of the plurality of the persons.

2. The camera control apparatus according to claim 1, wherein the at least one processor is further configured to execute the instructions to acquire in advance the control parameter by which the state of the image becomes an optimum state for authentication of the authentication target in the area.

3. The camera control apparatus according to claim 1, wherein the state of the image includes at least one of an average value of luminance values of the image, dispersion in the luminance values, a standard deviation of the luminance values, and a histogram of the luminance values.

4. The camera control apparatus according to claim 1, wherein the control parameter includes at least one of an exposure time, a sensitivity, and a contrast.

5. The camera control apparatus according to claim 1, wherein the at least one processor is further configured to execute the instructions to set the control parameter so that a state of the image of one of the plurality of the areas becomes an optimum state for authentication in a first frame, and set the control parameter so that a state of the image of another one of the plurality of the areas becomes an optimum state for authentication in a second frame after the first frame.

6. The camera control apparatus according to claim 1, wherein the at least one processor is further configured to execute the instructions to capture an image of the nearby environment.

7. The camera control apparatus according to claim 1, wherein the at least one processor is further configured to execute the instructions to store the image obtained by capturing the nearby environment.

8. The camera control apparatus according to claim 1, wherein the at least one processor is further configured to execute the instructions to determine the order in which images of the faces of the plurality of the persons are captured to be an order in which a direction of the face of each of the persons is closer to a front direction.

9. The camera control apparatus according to claim 1, wherein the at least one processor is further configured to execute the instructions to;

perform authentication processing for the person before the control parameter is set for each of the areas in accordance with the order;

acquire an authentication score as a result of the authentication processing; and determine the order in which images of the faces of the plurality of the persons are captured to be a descending order of the authentication scores instead of determining the order in which images of the faces of the plurality of the persons are captured based on the result of the determination.

10. The camera control apparatus according to claim 9, wherein when there is an unauthenticated person for whom the authentication processing has not been performed, the at least one processor is further configured to execute the instructions to adjust the order in which images of the faces of the plurality of the persons are captured so that the order of an image of the face of the unauthenticated person is moved up by a predetermined number.

11. The camera control apparatus according to claim 1, wherein the at least one processor is further configured to execute the instructions to determine the order in which images of the faces of the plurality of the persons are captured to be an order in which a brightness of each of the faces is closer to a brightness suitable for face authentication.

12. The camera control apparatus according to claim 1, wherein when a face of a person is captured by a camera provided on a driver's side of a vehicle, the at least one processor is further configured to execute the instructions to adjust the order in which images of the faces of the plurality of the persons are captured so that the order of an image of the face of the person captured by the camera provided on the driver's side is moved up by a predetermined number instead of determining the order in which images of the faces of the plurality of the persons are captured based on the result of the determination.

13. The camera control apparatus according to claim 1, wherein the at least one processor is further configured to execute the instructions to determine the order in which images of the faces of the plurality of the persons are captured to be an ascending order of distances between a smart key of a vehicle owned by the person and the camera control apparatus instead of determining the order in which images of the faces of the plurality of the persons are captured based on the result of the determination.

14. A camera control apparatus comprising:

at least one memory storing instructions, and at least one processor configured to execute the instructions to:

detect faces of a plurality of persons from an image obtained by capturing a nearby environment;

group the faces of the plurality of the persons based on sizes of the faces of the plurality of the persons, thereby generating a plurality of face groups;

determine a state of the image of each of the plurality of face groups;

determine an order of the plurality of face groups when images of the faces of the persons are captured based on a result of the determination about the state of the image of each of the plurality of face groups; and set a control parameter of the camera control apparatus for each of the plurality of face groups so that the state of the image of each of the faces of the plurality of the persons in each of the face groups becomes an optimum state for each of the face groups for authentication of the face of the person and control the camera control apparatus to capture images of the faces of the persons in each of the face groups in accordance with the order, wherein the authentication target is limited to a face of a person, and the at least one processor is further configured to execute the instructions to determine the order in which images of the faces of a plurality of the persons are captured to be a descending order of the sizes of the faces of the plurality of the persons.

15. A control method comprising:

detecting a plurality of authentication targets from an image obtained by capturing a nearby environment;

determining, for each of the plurality of authentication targets, a part of the image including the authentication target as an area;

determining a state of the image of each of a plurality of the areas;

determining an order in which images of the plurality of authentication targets are captured based on a result of the determination about the state of the image of each of the plurality of the areas; and setting a control parameter of a camera control apparatus for each of the plurality of the areas so that the state of the image of each of the areas becomes an optimum state for authentication of the authentication target in the area and controlling the camera control apparatus to capture an image of the authentication target in accordance with the order, wherein the authentication target is limited to a face of a person, and the determining an order includes determining the order in which images of the faces of a plurality of the persons are captured to be a descending order of the sizes of the faces of the plurality of the persons.

\*  \*  \*  \*  \*